United States Patent
Lee

(10) Patent No.: US 10,374,208 B2
(45) Date of Patent: Aug. 6, 2019

(54) RECHARGEABLE BATTERY

(71) Applicant: SAMSUNG SDI CO., LTD., Yongin-si, Gyeonggi-do (KR)

(72) Inventor: Jae-Wook Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 213 days.

(21) Appl. No.: 14/790,219

(22) Filed: Jul. 2, 2015

(65) Prior Publication Data

US 2016/0093866 A1     Mar. 31, 2016

(30) Foreign Application Priority Data

Sep. 30, 2014    (KR) .................. 10-2014-0131831

(51) Int. Cl.
  *H01M 2/30*    (2006.01)
  *H01M 2/02*    (2006.01)

(52) U.S. Cl.
  CPC .......... *H01M 2/30* (2013.01); *H01M 2/0217* (2013.01); *H01M 2/0237* (2013.01)

(58) Field of Classification Search
  CPC .... H01M 2/30; H01M 2/0217; H01M 2/0237; H01M 2/021; B23K 1/14; B23K 1/16; B23K 1/18
  See application file for complete search history.

(56) References Cited

U.S. PATENT DOCUMENTS

| | | | | |
|---|---|---|---|---|
| 1,371,907 A | * | 3/1921 | Koretzky | H01M 2/30 429/121 |
| 2,148,747 A | * | 2/1939 | Hampe | F16L 19/0206 228/140 |
| 3,733,695 A | * | 5/1973 | Frey, Jr. | H01C 1/14 29/610.1 |
| 3,823,464 A | * | 7/1974 | Chartet | B21D 39/06 228/136 |
| 4,576,325 A | * | 3/1986 | Maurice | B23P 11/00 188/26 |
| 4,866,748 A | * | 9/1989 | Caraher | H01J 35/101 378/121 |
| 4,915,426 A | * | 4/1990 | Skipper | E21B 17/08 285/288.1 |

(Continued)

FOREIGN PATENT DOCUMENTS

| | | |
|---|---|---|
| KR | 10-2007-0056428 A | 6/2007 |
| KR | 10-2012-0007263 A | 1/2012 |
| KR | 10-2012-0010092 A | 2/2012 |

*Primary Examiner* — Michael L Dignan
(74) *Attorney, Agent, or Firm* — Lee & Morse, P.C.

(57) ABSTRACT

A rechargeable battery includes an electrode assembly including a first electrode and a second electrode, a case for accommodating the electrode assembly, a cap plate in an opening of the case to seal the case, and electrode terminals electrically coupled to the electrode assembly, each electrode terminal having a rivet terminal extending through a terminal hole in the cap plate, a first end of the rivet terminal being electrically coupled to the electrode assembly, and a second end of the rivet terminal protruding out of the cap plate and including a protruding portion, and a conductive terminal coupled to the protruding portion of the rivet terminal, the conductive terminal and the protruding portion of the rivet terminal including different metals.

11 Claims, 10 Drawing Sheets

(56) References Cited

U.S. PATENT DOCUMENTS

| | | | | |
|---|---|---|---|---|
| 5,273,844 A * | 12/1993 | Casale | .................. | H01M 2/30 |
| | | | | 429/101 |
| 5,318,268 A * | 6/1994 | Cox | .................... | F16K 31/002 |
| | | | | 137/468 |
| 6,631,740 B1 * | 10/2003 | Jackson | ................ | F16L 13/08 |
| | | | | 138/109 |
| 7,971,772 B2 * | 7/2011 | Nishizawa | .......... | B23K 1/0008 |
| | | | | 228/246 |
| 8,801,278 B2 * | 8/2014 | Mogari | .................. | G01K 1/14 |
| | | | | 374/144 |
| 2001/0049054 A1 * | 12/2001 | Enomoto | .............. | H01M 2/04 |
| | | | | 429/158 |
| 2012/0021278 A1 * | 1/2012 | Byun | ................ | H01M 2/0473 |
| | | | | 429/179 |
| 2012/0315807 A1 * | 12/2012 | Sakae | ................ | H01M 2/206 |
| | | | | 439/887 |

* cited by examiner

RECHARGEABLE BATTERY

CROSS-REFERENCE TO RELATED APPLICATION

Korean Patent Application No. 10-2014-0131831 filed on Sep. 30, 2014, in the Korean Intellectual Property Office, and entitled: "Rechargeable Battery," is incorporated by reference herein in its entirety.

BACKGROUND

1. Field

Embodiments relate to a rechargeable battery provided with electrode terminals formed of different materials.

2. Description of the Related Art

A rechargeable battery differs from a primary battery in that it can be repeatedly charged and discharged, while the latter is incapable of being recharged. A low-capacity rechargeable battery is used in small portable electronic devices, e.g., mobile phones, notebook computers, and camcorders, while a high-capacity rechargeable battery is widely used as a power source for driving a motor, e.g., of a hybrid vehicle.

Typical rechargeable batteries may include, e.g., a nickel-cadmium (Ni—Cd) battery, a nickel-metal hydride (Ni-MH) battery, a lithium (Li) battery, a lithium ion (Li-ion) battery, etc. For example, the lithium ion rechargeable battery has an operating voltage about thrice as high as that of the Ni—Cd battery or Ni-MH battery that is widely used as a power supply for electronic devices. In addition, the lithium ion rechargeable battery has been widely used because its energy density per unit weight is high. In the rechargeable battery, a lithium-based oxide has been used as a positive active material, and a carbon material has been used as a negative active material.

Generally, batteries are classified into a liquid electrolyte battery and a polymer electrolyte battery depending on the type of electrolyte, and lithium batteries using a liquid electrolyte are called lithium ion batteries while batteries using a polymer electrolyte are called lithium polymer batteries. In such rechargeable batteries, terminals formed of a copper material protrude out of a case.

SUMMARY

Embodiments provide a rechargeable battery for allowing electrode terminals and a bus bar to be stably coupled.

An exemplary embodiment includes an electrode assembly having a first electrode and a second electrode, a case for accommodating the electrode assembly, a cap plate in an opening of the case to seal the case, and electrode terminals electrically coupled to the electrode assembly, each electrode terminal having a rivet terminal extending through a terminal hole in the cap plate, a first end of the rivet terminal being electrically coupled to the electrode assembly, and a second end of the rivet terminal protruding out of the cap plate and including a protruding portion, and a conductive terminal coupled to the protruding portion of the rivet terminal, the conductive terminal and the protruding portion of the rivet terminal including different metals.

A filler metal may be inserted between the protruding portion of the rivet terminal and the conductive terminal to be braze-welded.

Insertion grooves may be formed in the protruding portion to introduce the filler metal.

The insertion grooves may be a plurality of polygonal grooves that are formed inward of the protruding portion along a length direction of the protruding portion.

The insertion grooves may be a plurality of round grooves that are formed inward of the protruding portion along a length direction of the protruding portion.

An insertion hole may be formed in the conductive terminal to be inserted by the protruding portion, and an inner wall surface of the insertion hole may be formed with inflow grooves into which the filler metal is introduced.

The inflow grooves may be a plurality of polygonal grooves that are formed inward of the conductive terminal along a height direction of the inner wall surface of the insertion hole.

The insertion grooves may be a plurality of round grooves that are formed inward of the conductive terminal along a height direction of the inner wall surface of the insertion hole.

The protruding portion may be formed of a copper material, and the conductive terminal may be formed of an aluminum material.

An exemplary embodiment also includes a method of forming a rechargeable battery, including forming an electrode assembly including a first electrode and a second electrode, forming a case for accommodating the electrode assembly, forming a cap plate in an opening of the case to seal the case, and forming electrode terminals electrically coupled to the electrode assembly, each electrode terminal having a rivet terminal extending through a terminal hole in the cap plate, a first end of the rivet terminal being electrically coupled to the electrode assembly, and a second end of the rivet terminal protruding out of the cap plate and including a protruding portion, and a conductive terminal coupled to the protruding portion of the rivet terminal, the conductive terminal and the protruding portion of the rivet terminal including different metals.

A filler metal may be inserted between the protruding portion of the rivet terminal and the conductive terminal, such that the protruding portion of the rivet terminal and the conductive terminal are braze-welded through the filler metal.

The protruding portion may be formed of copper, and the conductive terminal may be formed of aluminum.

BRIEF DESCRIPTION OF THE DRAWINGS

Features will become apparent to those of ordinary skill in the art by describing in detail exemplary embodiments with reference to the attached drawings. in which.

DETAILED DESCRIPTION

Figure 1:
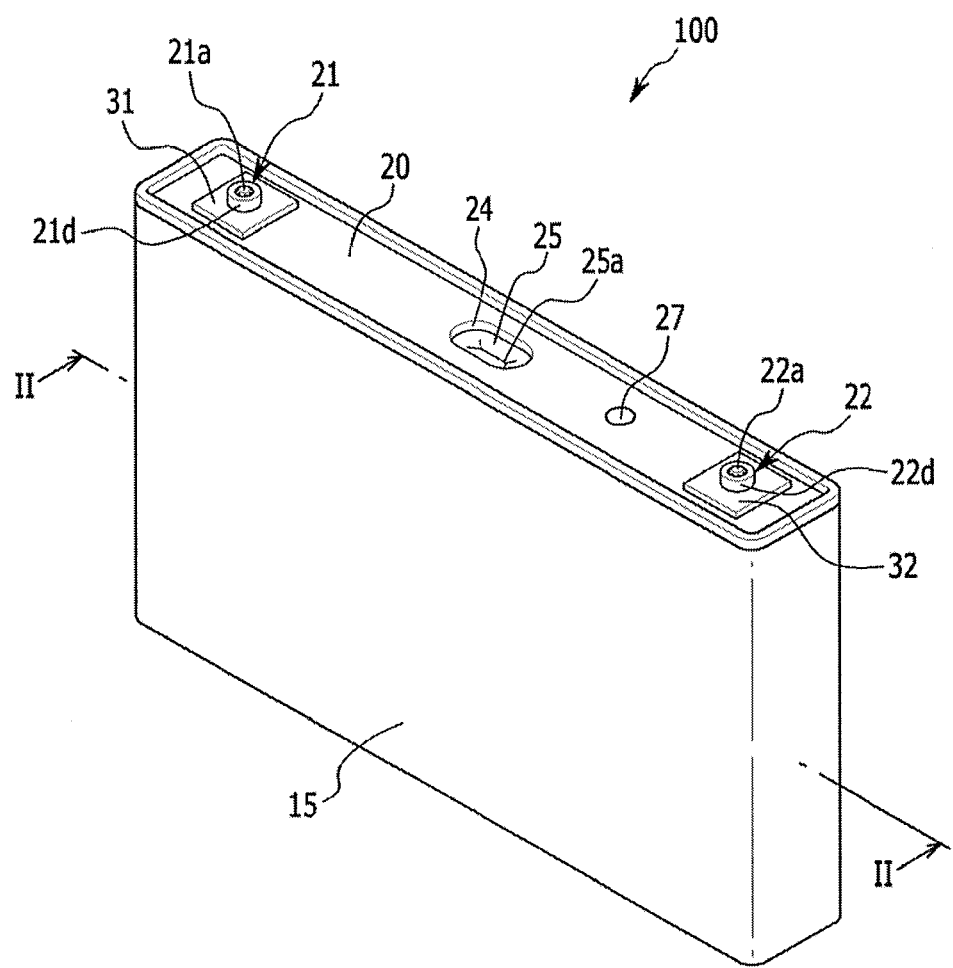
FIG. 1 illustrates a schematic perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
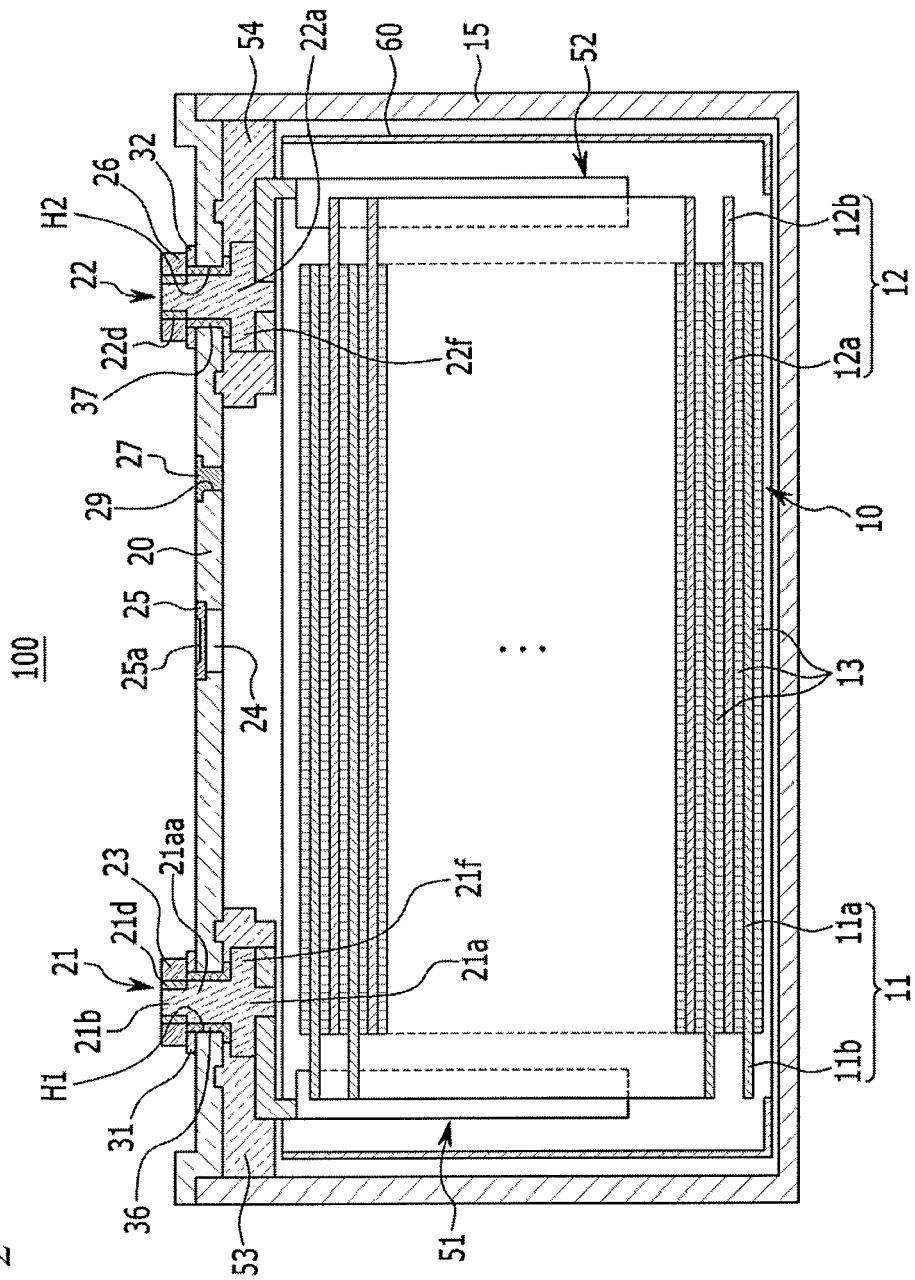
FIG. 2 illustrates a cross-sectional view of FIG. 1 taken along line II-II.

FIG. 1 is a schematic perspective view of a rechargeable battery according to a first exemplary embodiment, and FIG. 2 is a cross-sectional view of FIG. 1 taken along line II-II.

As shown in FIGS. 1 and 2, a rechargeable battery 100 according to the first exemplary embodiment may include an electrode assembly 10 in which a current is charged and discharged, first and second electrode terminals 21 and 22 electrically coupled to the electrode assembly 10, a case 15 for accommodating the electrode assembly 10, and a cap plate 20 installed in an opening of the case 15 to seal the case 15 and formed with terminal holes H1 and H2.

For example, the electrode assembly 10 is formed by disposing a first electrode 11 (hereinafter referred to as a "negative electrode 11") and a second electrode 12 (hereinafter referred to as a "positive electrode 12") at opposite sides of a separator 13, which serves as an insulator, and then spirally winding the negative electrode 11, the separator 13, and the positive electrode 12 in a jelly roll state. The positive and negative electrodes 11 and 12 respectively include coated regions 11a and 12a, where an active material is coated on a current collector made of a metal plate, and uncoated regions 11b and 12b having exposed portions of the current collector on which the active material is not coated.

The uncoated region 11b of the negative electrode 11 is formed at one end portion of the negative electrode 11 along the spirally wound negative electrode 11. The uncoated region 12b of the positive electrode 12 is formed at one end portion of the positive electrode 12 along the spirally wound positive electrode 12. Accordingly, the uncoated regions 11b and 12b are respectively disposed at opposite ends of the electrode assembly 10.

For example, the case 15 may be substantially formed as a cuboid in which a space for accommodating the electrode assembly 10 and an electrolyte solution is set, and the opening may be formed at one side of the cuboid to connect inner and outer spaces of the case 15. The opening allows the electrode assembly 10 to be inserted into the case 15.

The cap plate 20 is installed in the opening of the case 15 to seal the case 15. For example, the case 15 and the cap plate 20 may be formed of aluminum such that they are welded to each other. In addition, an electrolyte injection opening 29, a vent hole 24, and the terminal holes H1 and H2 are provided in the cap plate 20.

After the cap plate 20 is combined to the case 15, the electrolyte injection opening 29 allows the electrolyte solution to be injected into the case 15. After being injected with the electrolyte solution, the electrolyte injection opening 29 is sealed by a sealing cap 27.

The vent hole 24 is sealed by a vent plate 25 so as to discharge internal pressure of the rechargeable battery 100. The vent plate 25 is ruptured to open the vent hole 24 when the internal pressure of the rechargeable battery 100 reaches a predetermined pressure. A notch groove 25a may be provided in the vent plate 25 to induce the rupture.

The electrode terminals 21 and 22 include the negative and positive electrode terminals 21 and 22, respectively, and are provided in the terminal holes H1 and H2 of the cap plate 20. The electrode terminals 21 and 22 are electrically coupled to the electrode assembly 10. That is, the negative electrode terminal 21 is electrically coupled to the negative electrode 11 of the electrode assembly 10, and the positive electrode terminal 22 is electrically coupled to the positive electrode 12 of the electrode assembly 10. Thus, the electrode assembly 10 may be drawn out of the case 15 through the negative and positive electrode terminals 21 and 22. The electrode terminals 21 and 22 will be described in more detail with reference to FIGS. 3 and 4.

Figure 3:
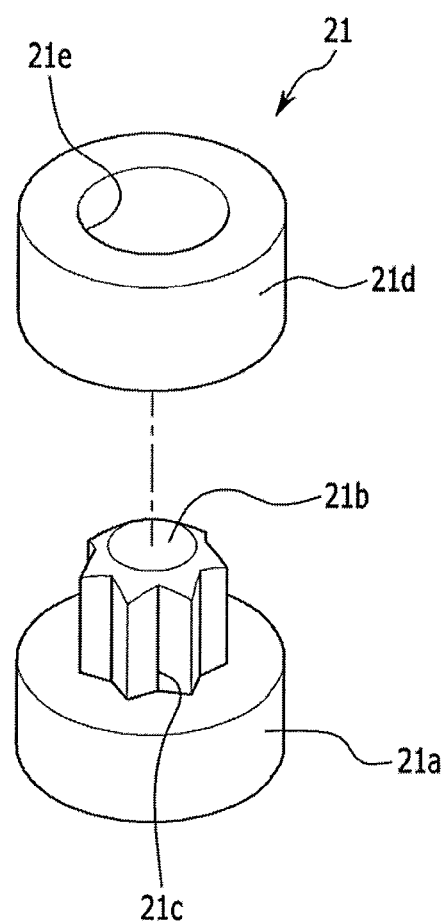
FIG. 3 illustrates a schematic exploded perspective view of a principal part of an electrode terminal that protrudes out of a case of the rechargeable battery of FIG. 1.
Figure 4:
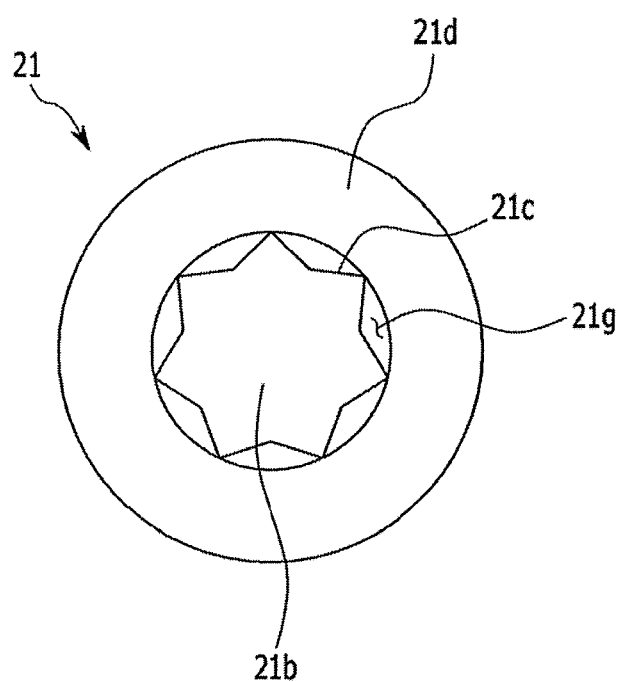
FIG. 4 illustrates a top plan view of a protruding portion of the electrode terminal of FIG. 3 and a conductive terminal combined to each other.

FIG. 3 is a schematic exploded perspective view of a principal part of the negative electrode terminal 21 protruding out of the case 15 of the rechargeable battery 100, and FIG. 4 is a top plan view of the protruding portion of the negative electrode terminal 21 and the conductive terminal combined to each other.

Referring to FIGS. 1-4, the electrode terminals 21 and 22 may include rivet terminals 21a and 22a that are installed in the terminal holes H1 and H2 of the cap plate 20, respectively, to be electrically coupled to the electrode assembly 10, and conductive terminals 21d and 22d that are insertedly combined to the respective rivet terminals 21a and 22a outside thereof. Since the conductive terminals 21d and 22d are formed in the negative and positive terminals 21 and 22, respectively, such that they have the same shape and the same configuration, only the conductive terminal 21d installed in the negative terminal 21 will now be exemplarily described.

A first end of the rivet terminal 21a is electrically coupled to the electrode assembly 10 inside the case 15, e.g., by welding or the like. A second end of the rivet terminal 21a protrudes out of the terminal hole H1, and a protruding portion 21b having a smaller diameter than the rivet terminal 21a is formed at the protruded end portion. For example, as illustrated in FIG. 2, an upper portion 21aa of the rivet terminal 21a protrudes above an upper surface of the case 15, e.g., to be external to the case 15, and the protruding portion 21b extends vertically, e.g., upward, from the upper portion 21aa of the rivet terminal 21a.

The protruding portion 21b may be inserted, while being press-fitted, into the conductive terminal 21d to be combined thereto by welding. In more detail, while being press-fitted into the protruding portion 21b, the conductive terminal 21d may be braze-welded to be combined thereto.

Figure 9:
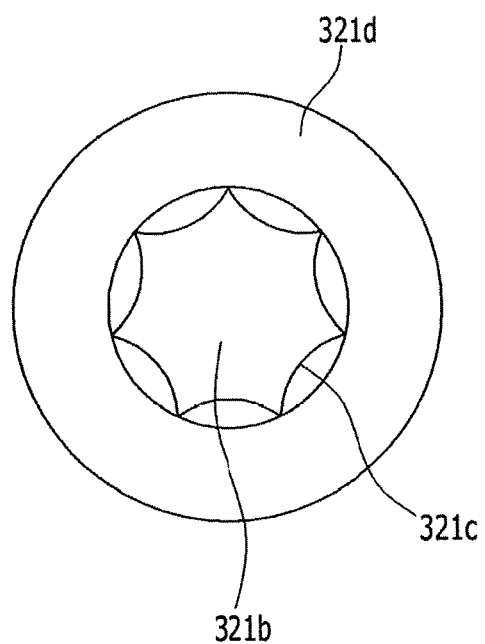
FIG. 9 illustrates a schematic top plan view of a protruding portion of the electrode terminal and a conductive terminal of according to a fourth exemplary embodiment.

In detail, as illustrated in FIG. 3, a plurality of insertion grooves 21c may be formed along a circumference of a protruding outer surface of the protruding portion 21b. For example, each insertion groove 21c may extend along an entire length, e.g., along the z-axis, of the protruding portion 21b, and may be radially spaced apart from an adjacent insertion groove 21c. In the present exemplary embodiment, the insertion grooves 21c may be formed as polygonal grooves that are inwardly depressed from the outer surface of the protruding portion 21b. However, in embodiments, the insertion grooves 21c are not necessarily limited to the polygonal grooves. As shown FIG. 9, a protruding portion 321b is inserted into the conductive terminal 321d, and inflow grooves 321c depressed inwardly of the protruding portion 321b may be formed as round grooves.

The insertion grooves 21c are formed in the protruding portion 21b to allow a filler metal to be introduced, while the conductive terminal 21d is combined with the protruding portion 21b. This will now be described in more detail.

As further illustrated in FIG. 3, an insertion hole 21e is formed in the conductive terminal 21d, so the protruding portion 21b of the rivet terminal 21a can be inserted therethrough. That is, the conductive terminal 21d is formed as a ring type, a center part of which is formed with the insertion hole 21e, such that it can accommodate insertion of the protruding portion 21b of the rivet terminal 21a through the insertion hole 21e.

In the present exemplary embodiment, the conductive terminal 21d is combined to an outer surface of the protruding portion 21b of the rivet terminal 21a by an initial press-fit. While being press-fitted into the protruding portion 21b of the rivet terminal 21a, the conductive terminal 21d may be braze-welded using the filler metal between the protruding portion 21b and the conductive terminal 21d to be finally combined.

Referring to FIG. 4, due to the insertion grooves 21c, an inflow space 21g is formed between the protruding portion 21b and the conductive terminal 21d. For example, as illustrated in FIG. 4, the insertion grooves 21c define concave portions of the protruding portion 21b when viewed in top view, e.g., concave portions pressed toward a center of the protruding portion 21b relative to an outermost surface of the protruding portion 21b, so the inflow space 21g is defined in the grooves 21c between an inner surface of the conductive terminal 21d and an outer surface of the protruding portion 21b.

The filler metal may be introduced through, i.e., into, the inflow space, while the protruding portion 21b and the conductive terminal 21d are braze-welded. The filler metal refers to a brazing filler that is used to bond different kinds of metals during a braze-welding process, and may be introduced, while the filler metal is being melted, into the inflow space 21g serving as a capillary that is formed by the insertion groove 21c. In the present exemplary embodiment, the filler metal may be formed of a low temperature fusing metal that can be melted at about 200° C. to about 300° C., e.g., a low fusing metal including tin (Sn).

In the present exemplary embodiment, the protruding portion 21b of the rivet terminal 21a may be formed, e.g., consists essentially, of a copper material, and the conductive terminal 21d may be formed, e.g., consist essentially, of an aluminum material. Accordingly, with improved welding quality, a bus bar (not shown) formed of the aluminum material may be stably combined, e.g., attached, to the conductive terminal 21d that is formed of the aluminum material. In this case, the conductive terminal 21d may be directly coupled to the bus bar, or may be coupled through a lead terminal (not shown) that is formed of the aluminum material.

As described above, the conductive terminal 21d having a ring shape is combined, e.g., attached, to the protruding portion 21b of the rivet terminal 21a outside thereof using the filler metal, thereby stably combining them, as well as improving electrical connectivity therebetween. That is, the filler metal in the inflow space 21g may connect between the aluminum conductive terminal 21d and the copper rivet terminal 21a, thereby stably combining therebetween to improve electrical connectivity therebetween.

Referring back to FIG. 2, negative and positive electrode gaskets 36 and 37 are respectively installed between the rivet terminals 21a and 22a of the negative and positive electrode terminals 21 and 22 and inner sides of the terminal holes H1 and H2 of the cap plate 20, respectively, to seal and electrically insulate therebetween. The negative and positive electrode gaskets 36 and 37 are installed to be further extended between the flanges 21f and 22f and the inner sides of the cap plate 20, thereby further sealing and electrically insulating the flanges 21f and 22f and the cap plate 20. That is, since the negative and positive electrode gaskets 36 and 37 and the negative and positive electrode terminals 21 and 22 are installed in the cap plate 20, leakage of the electrolyte solution through the terminal holes H1 and H2 can be prevented.

Negative and positive current collecting tabs 51 and 52 allow the negative and positive electrode terminals 21 and 22 to be respectively electrically coupled to the negative and positive terminals 11 and 12 of the electrode assembly 10. That is, by combining the negative and positive current collecting tabs 51 and 52 to lower ends of the rivet terminals 21a and 22a, respectively, and then caulking the lower ends thereof, the negative and positive current collecting tabs 51 and 52 are supported by the flanges 21f and 22f and are coupled to the lower ends of the rivet terminals 21a and 22a.

Lower insulating members 53 and 54 are respectively installed between the negative and positive current collecting tabs 51 and 52, respectively, and the cap plate 20 to electrically insulate the negative and positive current collecting tabs 51 and 52 from the cap plate 20. In addition, one side of each of the lower insulating members 53 and 54 is combined to the cap plate 20 while the other side encloses the negative and positive current collecting tabs 51 and 52, the rivet terminals 21a and 22a, and the flanges 21f and 22f, thereby stabilizing a connecting structure therebetween.

An upper insulating member 31 is installed between a plate terminal 23 and the cap plate 20 in the negative terminal 21 to electrically insulate the plate terminal 23 from the cap plate 20. That is, the cap plate 20 maintains a state of being electrically insulated from the negative terminal 21. For example, the upper insulating member 31 is interposed between the plate terminal 23 and the cap plate 20, and the rivet terminal 21a extends, e.g., is inserted, therethrough. Accordingly, by combining the upper insulating member 31 and the plate terminal 23 to the upper portion 21aa of the rivet terminal 21a and then caulking the upper portion 21aa thereof, the upper insulating member 31 and the plate terminal 23 are combined to the upper portion 21aa of the rivet terminal 21a.

The negative electrode gasket 36 is installed to be further extended between the rivet terminal 21a and the upper insulating member 31. That is, the negative electrode gasket 36 further reinforces sealing and electrical insulation between the rivet terminal 21a and the upper insulating member 31.

A top plate 32 is formed in the positive electrode terminal 22 as a conductive member, and is provided between a plate terminal 26 and the cap plate 20 to electrically couple the plate terminal 26 and the cap plate 20. That is, the cap plate 20 maintains a state of being electrically coupled to the electrode assembly 10 through the positive electrode terminal 22. For example, the top plate 32 is interposed between the plate terminal 26 and the cap plate 20, and is penetrated by the rivet terminal 22a. Accordingly, by combining the top plate 32 and the plate terminal 26 to an upper end of the rivet terminal 22a and then caulking the upper end thereof, the top plate 32 and the plate terminal 26 are coupled to the upper end of the rivet terminal 22a.

The positive electrode gasket 37 is installed to be further extended between the rivet terminal 22a and the top plate 32. That is, the positive electrode gasket 37 prevents the rivet terminal 22a and the top plate 32 from directly being electrically coupled to each other. That is, the rivet terminal 22a is electrically coupled to the top plate 32 through the plate terminal 26, and is electrically coupled to the cap plate 20 through the top plate 32.

Figure 5:
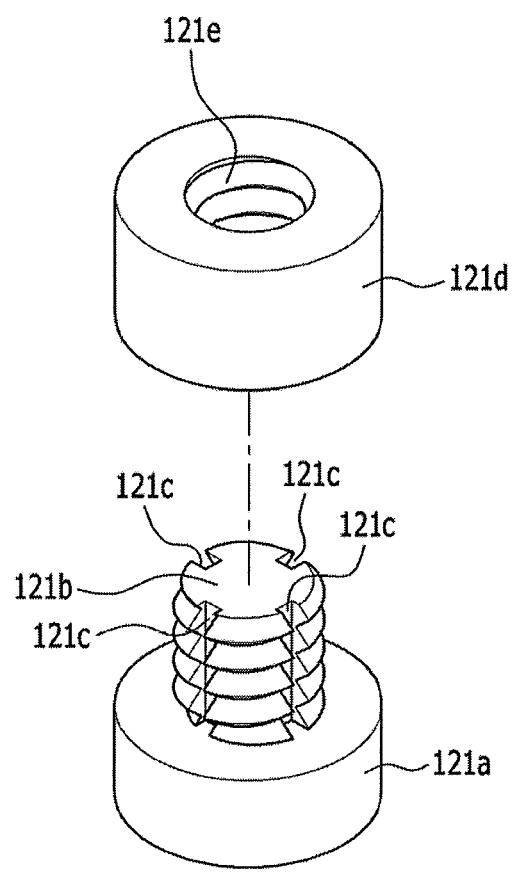
FIG. 5 illustrates a schematic exploded perspective view of a principal part of an electrode terminal according to a second exemplary embodiment.
Figure 6:
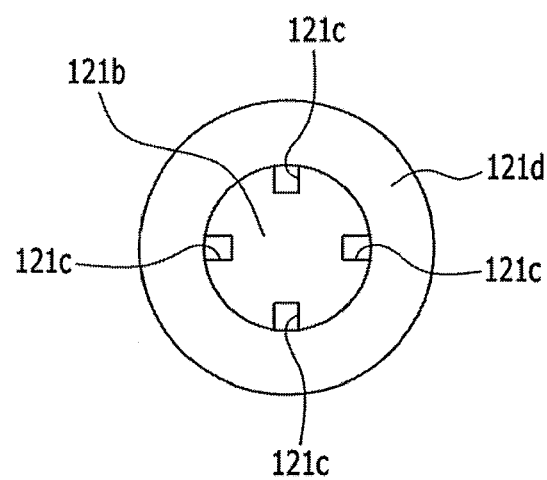
FIG. 6 illustrates a schematic top plan view of a protruding portion of the electrode terminal of FIG. 5 and a conductive terminal combined to each other.

FIG. 5 is a schematic exploded perspective view of a principal part of an electrode terminal according to a second exemplary embodiment, and FIG. 6 is a schematic top plan view of a protruding portion of the electrode terminal of FIG. 5 and a conductive terminal combined to each other. The same reference numerals as those in FIGS. 1 to 4 refer to the same members having the same functions, and a detailed description of the same reference numerals will now be omitted.

As shown in FIGS. 5 and 6, according to the second exemplary embodiment, a plurality of insertion grooves 121c are formed along a circumference of a protruding portion 121b of the rechargeable battery. The insertion grooves 121c may be formed as polygonal grooves along the circumference of the protruding portion 121b while being equally spaced from each other.

In addition, a thread is formed at an external surface of the protruding portion 121b, such that it is stably fixed to an insertion hole 121e of a conductive terminal 121d while being screw-coupled thereto. As such, while being initially screw-coupled to the protruding portion 121b to be combined thereto, the conductive terminal 121d may be fixed to the protruding portion 121b while being braze-welded thereto. Accordingly, the conductive terminal 121d can be more stably fixed to the protruding portion 121b of a rivet terminal 121a in addition to securing electrical connectivity therebetween.

Figure 7:
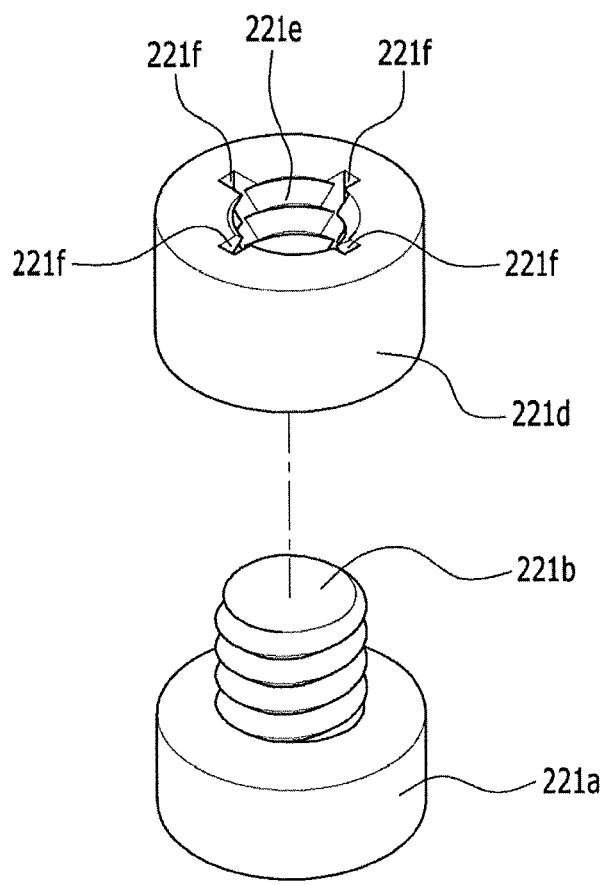
FIG. 7 illustrates a schematic exploded perspective view of a principal part of an electrode terminal according to a third exemplary embodiment.
Figure 8:
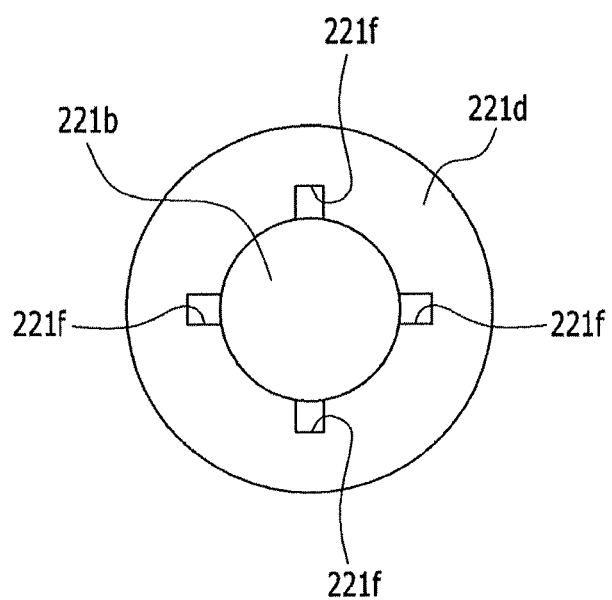
FIG. 8 illustrates a schematic top plan view of a protruding portion of the electrode terminal of FIG. 7 and a conductive terminal combined to each other.

FIG. 7 is a schematic exploded perspective view of a principal part of an electrode terminal according to a third exemplary embodiment, and FIG. 8 is a schematic top plan view of a protruding portion of the electrode terminal of FIG. 7 and a conductive terminal combined to each other. The same reference numerals as those in FIGS. 1 to 6 refer to the same members having the same functions, and a detailed description of the same reference numerals will now be omitted.

Figure 10:
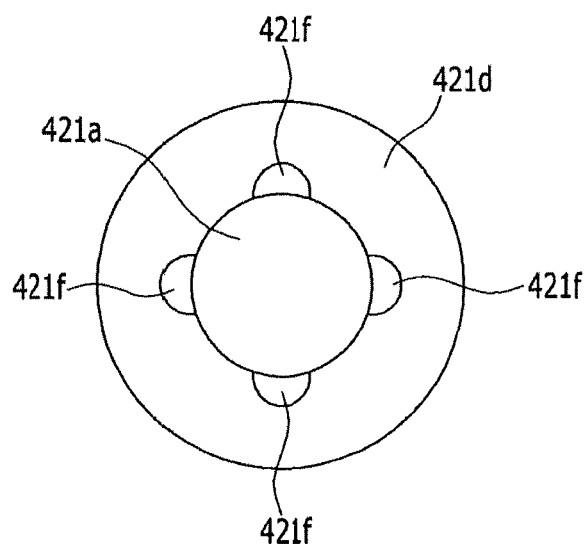
FIG. 10 illustrates a schematic top plan view of a protruding portion of the electrode terminal and a conductive terminal of according to a fifth exemplary embodiment.

As shown in FIGS. 7 and 8, according to the third exemplary embodiment, a plurality of inflow grooves 221f are formed at an inner wall surface of an insertion hole 221e of a conductive terminal 221d. The plurality of inflow grooves 221f may be formed as polygonal grooves along a circumference of the inner wall surface of the insertion hole 221e of the conductive terminal 221d. However, the inflow grooves 221f are not necessarily limited to the polygonal shapes. As shown FIG. 10, the rivet terminal 421a is screw-coupled to the conductive terminal 421d, and inflow grooves 421f depressed inwardly of the conductive terminal 421d may be formed as round grooves. The inflow grooves 221f are formed in the conductive terminal 221d to provide a space for the filler metal to be introduced between the conductive terminal 221d and a protruding portion 221b.

A thread is formed at an external surface of the protruding portion 221b of a rivet terminal 221a. As such, the rivet terminal 221a is screw-coupled to the conductive terminal 221d to be fixed thereto. As described above, the conductive terminal 221d of the present exemplary embodiment can be both screw-coupled and braze-welded to the rivet terminal 221a to be combined thereto, thereby being stably combined as well as improving the electrical connectivity therebetween.

By way of summation and review, when a bus bar of one material, e.g., aluminum, is coupled to electrode terminals formed of a different material, e.g., copper, the electrode terminals and the bus bar may not be easily welded. Therefore, according to exemplary embodiments, electrode terminals are formed of multiple materials, e.g., copper and aluminum, thereby facilitating stable coupling between the electrode terminals and an aluminum bus bar. That is, the electrode terminals are formed of different materials and braze-welded using a filler metal therebetween, thereby being stably combined to the bus bar as well as improving electrical conductivity of the electrode terminals.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a first electrode and a second electrode;
a case for accommodating the electrode assembly;
a cap plate in an opening of the case to seal the case; and
electrode terminals electrically coupled to the electrode assembly, each electrode terminal including:
a rivet terminal extending through a terminal hole in the cap plate, a first end of the rivet terminal being electrically coupled to the electrode assembly, and a second end of the rivet terminal protruding out of the cap plate and including a protruding portion, the protruding portion including insertion grooves depressed inwardly of the protruding portion, the insertion grooves extending in a straight line in a length direction along an entire length of the protruding portion;
a conductive terminal coupled to the protruding portion of the rivet terminal, the conductive terminal and the protruding portion of the rivet terminal including different metals, and at least two different surfaces of the conductive terminal being perpendicular to each other and in direct contact with the rivet terminal, and a filler metal portion in the insertion grooves, the filler metal portion being in direct contact with each of the protruding portion of the rivet terminal and the conductive terminal, wherein:

an external surface of the protruding portion includes a thread so as to be screw-couplable with the conductive terminal, and the insertion grooves extend through the thread in the length direction.

2. The rechargeable battery as claimed in claim 1, wherein the insertion grooves are a plurality of polygonal grooves depressed inwardly of the protruding portion along the length direction of the protruding portion.

3. The rechargeable battery as claimed in claim 1, wherein the insertion grooves are a plurality of round grooves depressed inwardly of the protruding portion along the length direction of the protruding portion.

4. The rechargeable battery as claimed in claim 1, wherein the conductive terminal includes an insertion hole, the protruding portion being inserted into the insertion hole.

5. A rechargeable battery, comprising:
an electrode assembly including a first electrode and a second electrode;
a case for accommodating the electrode assembly;
a cap plate in an opening of the case to seal the case; and
electrode terminals electrically coupled to the electrode assembly, each electrode terminal including:
a rivet terminal extending through a terminal hole in the cap plate, a first end of the rivet terminal being electrically coupled to the electrode assembly, and a second end of the rivet terminal protruding out of the cap plate and including a protruding portion;
a conductive terminal including an insertion hole, the protruding portion of the rivet terminal being inserted into the insertion hole and coupled to the conductive terminal, the conductive terminal and the protruding portion of the rivet terminal including different metals, and at least two different surfaces of the conductive terminal being perpendicular to each other and in direct contact with the rivet terminal; and
a filler metal portion, the filler metal portion being in direct contact with each of the protruding portion of the rivet terminal and the conductive terminal,
wherein an inner wall surface of the insertion hole includes inflow grooves that extend in a straight line in a height direction along an entire height of the inner wall surface of the insertion hole, the filler metal portion being in the inflow grooves, wherein:
the inner wall surface of the insertion hole includes a thread so as to be screw-couplable with the protrusion portion, and
the inflow grooves extend through the thread in the length direction.

6. The rechargeable battery as claimed in claim 5, wherein the inflow grooves are a plurality of polygonal grooves depressed inwardly of the conductive terminal along the height direction of the inner wall surface of the insertion hole.

7. The rechargeable battery as claimed in claim 5, wherein the inflow grooves are a plurality of round grooves depressed inwardly of the conductive terminal along the height direction of the inner wall surface of the insertion hole.

8. The rechargeable battery as claimed in claim 1, wherein the protruding portion includes a copper material, and the conductive terminal includes an aluminum material.

9. A method of forming a rechargeable battery, the method comprising:
forming an electrode assembly including a first electrode and a second electrode;
forming a case for accommodating the electrode assembly;
forming a cap plate in an opening of the case to seal the case; and
forming electrode terminals electrically coupled to the electrode assembly, each electrode terminal including:
a rivet terminal extending through a terminal hole in the cap plate, a first end of the rivet terminal being electrically coupled to the electrode assembly, and a second end of the rivet terminal protruding out of the cap plate and including a protruding portion,
a conductive terminal including an insertion hole, the protruding portion of the rivet terminal being inserted into the insertion hole and coupled to the conductive terminal, the conductive terminal and the protruding portion of the rivet terminal including different metals, and at least two different surfaces of the conductive terminal being perpendicular to each other and in direct contact with the rivet terminal, and
a filler metal portion in direct contact with each of the protruding portion of the rivet terminal and the conductive terminal,
wherein either the protruding portion of the rivet terminal includes insertion grooves depressed inwardly of the protruding portion in a straight line in a length direction along an entire length of the protruding portion, the filler metal portion being in the insertion grooves, or an inner wall surface of the insertion hole includes inflow grooves in a straight line in a height direction along an entire height of the inner wall surface or the insertion hole, the filler metal portion being in the inflow grooves, wherein:
an external surface of the protruding portion or the inner wall surface of the insertion hole includes a thread so that the protruding portion and the conductive terminal are screw-couplable, and
the insertion grooves extend through the thread in the length direction of the protruding portion, or the inflow grooves extend through the thread in the height direction of the inner wall of the insertion hole.

10. The method as claimed in claim 9, wherein the filler metal portion is inserted between sections of the protruding portion of the rivet terminal and the conductive terminal, such that the protruding portion of the rivet terminal and the conductive terminal are braze-welded through the filler metal portion.

11. The method as claimed in claim 10, wherein the protruding portion is foil red of copper, and the conductive terminal is formed of aluminum.

* * * * *